United States Patent
Maeda

(10) Patent No.: US 9,744,928 B1
(45) Date of Patent: Aug. 29, 2017

(54) ATTACHMENT STRUCTURE OF FRONT FENDER COVER

(71) Applicant: KAWASAKI JUKOGYO KABUSHIKI KAISHA, Hyogo (JP)

(72) Inventor: Kazuhiro Maeda, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/092,862

(22) Filed: Apr. 7, 2016

(51) Int. Cl.
*B60J 7/00* (2006.01)
*B60R 19/28* (2006.01)
*B60R 19/42* (2006.01)

(52) U.S. Cl.
CPC .............. *B60R 19/28* (2013.01); *B60R 19/42* (2013.01)

(58) Field of Classification Search
CPC ........ B62K 2202/00; B62K 5/01; B62J 15/00; B62J 17/02; B62J 15/02; F02M 35/162
USPC ........ 296/203.02, 187.09, 198, 78.1, 136.07; 180/219
See application file for complete search history.

(56) References Cited

U.S. PATENT DOCUMENTS

| | | | | |
|---|---|---|---|---|
| 7,578,523 B2* | 8/2009 | Kosuge | ................ | B62D 21/186 280/756 |
| 7,669,678 B2* | 3/2010 | Benedict | ................. | B62J 15/00 180/89.1 |
| 8,827,357 B2 | 9/2014 | Kaku et al. | | |
| 9,440,527 B1* | 9/2016 | Maeda | ................... | B60K 11/04 |
| 2002/0047257 A1* | 4/2002 | Rondeau | ................. | B62J 15/00 280/849 |
| 2011/0094816 A1* | 4/2011 | Suzuki | ................. | B62D 21/183 180/291 |
| 2012/0200118 A1* | 8/2012 | Yamagishi | ........... | B62D 25/163 296/192 |
| 2013/0221705 A1* | 8/2013 | Sugishima | .......... | B60R 13/0838 296/192 |
| 2014/0158447 A1* | 6/2014 | Peterson | .................. | B62K 5/01 180/219 |
| 2016/0167715 A1* | 6/2016 | Kosuge | ................. | B62D 25/10 296/181.1 |
| 2016/0251038 A1* | 9/2016 | Kawata | ................ | B62D 25/087 296/190.08 |
| 2016/0280058 A1* | 9/2016 | Uzaki | .................. | B62D 25/082 |
| 2016/0347375 A1* | 12/2016 | Kaba | .................... | B62D 25/081 |

\* cited by examiner

*Primary Examiner* — Kiran B Patel
(74) *Attorney, Agent, or Firm* — Wenderoth, Lind & Ponack, L.L.P.

(57) ABSTRACT

An attachment structure of a front fender cover of a utility vehicle, the attachment structure includes: a front fender; a front fender cover attached to the front fender by being inserted to a first end of the front fender and locked at a second end of the front fender; and a retaining member attached to the front fender or the front fender cover and configured to retain the front fender cover at the second end of the front fender at a predetermined distance from the front fender in a state where the front fender cover is inserted to the front fender and is not locked.

5 Claims, 8 Drawing Sheets

ATTACHMENT STRUCTURE OF FRONT FENDER COVER

BACKGROUND OF THE INVENTION

1. Field of the Invention

The present invention relates to an attachment structure of a front fender cover of a utility vehicle.

2. Description of the Related Art

As described in U.S. Pat. No. 8,827,357, a conventional front fender cover of a utility vehicle has been detachably attached to a front fender. The front fender cover attached to the front fender is inserted to a first end (a first end in the anteroposterior direction) of the front fender and locked at a second end of the front fender.

SUMMARY OF THE INVENTION

In the configuration described above, the front fender cover is inserted to the first end of the front fender even in a state where the front fender cover is not locked at the second end of the front fender cover. Problematically, a crew may not notice that the front fender cover is not locked to the front fender.

In view of the above, it is an object of the present invention to provide an attachment structure of a front fender cover, which allows a user to readily notice a state where the front fender cover is not locked to a front fender.

In order to achieve the object, the present invention provides an attachment structure of a front fender cover of a utility vehicle, the attachment structure including:

a front fender;

a front fender cover attached to the front fender by being inserted to a first end of the front fender and locked at a second end of the front fender; and a retaining member attached to the front fender or the front fender cover and configured to retain the front fender cover at the second end of the front fender at a predetermined distance from the front fender in a state where the front fender cover is inserted to the front fender and is not locked.

According to the above configuration, the retaining member retains the front fender cover at the predetermined distance from the front fender in the state where the front fender cover is not locked. A user will thus readily notice the state where the front fender cover is not locked.

The present invention is preferred to further adopt any of the following configurations.

(1) The retaining member is a spring member.

(2) The retaining member is positioned adjacent to each of a pair of lock members that is aligned in a vehicle width direction and is configured to lock the front fender cover to the front fender.

(3) The retaining member is a spring coil member, and the retaining member is attached by being jointly fastened by a bolt that attaches the front fender to a lower fender cover positioned below the front fender.

(4) In the configuration (3), the front fender cover has a buffer member that is attached to be in contact with the retaining member.

The configuration (1) relates to a specific configuration of the retaining member, and allows the retaining member to be easily provided so as to retain the front fender cover at the predetermined distance from the front fender.

According to the configuration (2), the retaining member is positioned adjacent to the lock member. The retaining member thus enables readily checking the state where the front fender cover is not locked.

According to the configuration (3), the retaining member is attached with the existing bolt that attaches the front fender to the lower fender cover, so that the retaining member has a simplified attachment structure.

According to the configuration (4), the buffer member prevents a scratch from occurring to the front fender cover due to contact between the front fender cover and the retaining member.

As described above, the present invention provides an attachment structure of a front fender cover, which allows a user to readily notice a state where the front fender cover is not locked to a front fender.

DETAILED DESCRIPTION OF THE INVENTION

[Entire Structure of Vehicle]

Figure 1:
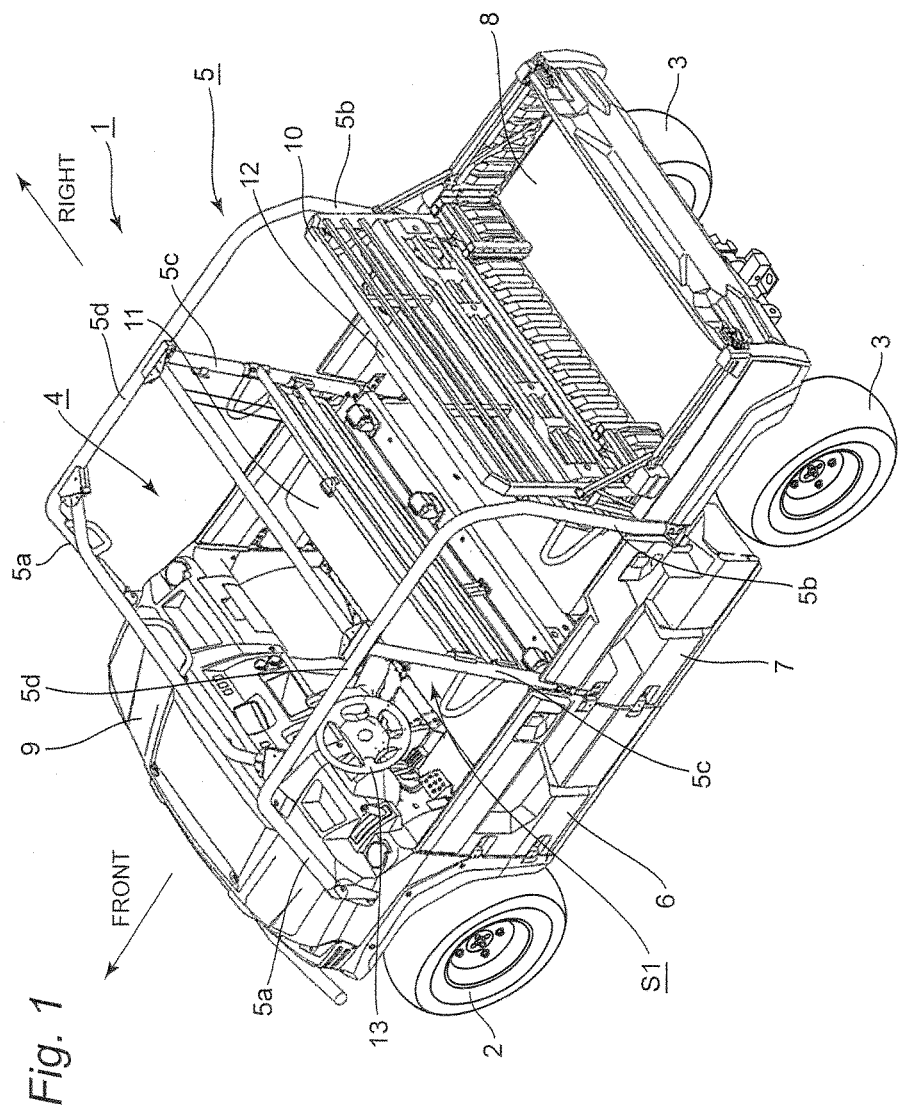
FIG. 1 is a perspective view of a utility vehicle including an attachment structure of a front fender cover according to an embodiment of the present invention.
Figure 2:
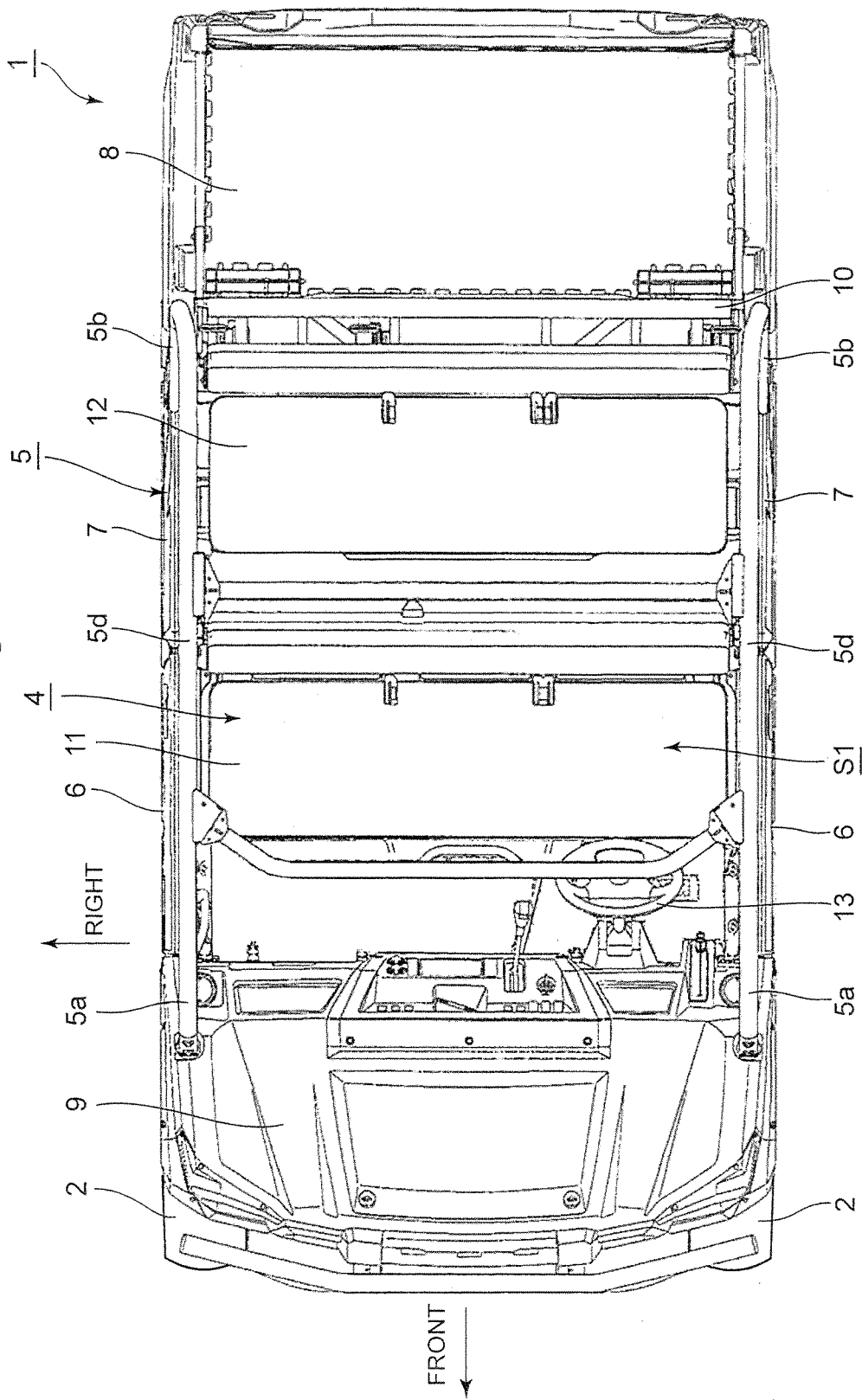
FIG. 2 is a top view of the utility vehicle shown in FIG. 1.

FIG. 1 is a perspective view of a utility vehicle including an attachment structure of a front fender cover according to an embodiment of the present invention. Assume that the concept of directions according to the present embodiment matches the concept of directions viewed from a driver of the utility vehicle. FIG. 2 is a top view of the utility vehicle shown in FIG. 1.

As shown in FIGS. 1 and 2, a utility vehicle 1 includes a pair of right and left front wheels 2 at a vehicle front portion, a pair of right and left rear wheels 3 at a vehicle rear portion, and a riding space (cabin) 4 between the front wheels 2 and the rear wheels 3. The riding space 4 is surrounded with a ROPS 5, a pair of right and left front doors 6, and a pair of right and left rear doors 7. The ROPS is an abbreviation for a rollover protective structure. The ROPS 5 configures part of a chassis frame, and includes a pair of right and left front vertical members 5a, a pair of right and left rear vertical members 5b, a pair of right and left intermediate vertical members 5c disposed between the front vertical members 5a and the rear vertical members 5b, and a plurality of upper end beam members 5d connecting the upper ends of the vertical members 5a, 5b, and 5c.

The riding space 4 is provided therebehind with a cargo bed 8, and is provided thereahead with a front cover assembly 9 that forms a front chamber and wheel housings of the front wheels 2. The cargo bed 8 is provided, at the front end, with a screen 10 that partitions between the riding space 4 and the cargo bed 8. The front half of the riding space 4 is provided with a front bench seat 11 and the rear half of the riding space 4 is provided with a rear bench seat 12. The front seat 11 has a left seat region S1 serving as a driver's seat. The left seat region S1 is provided thereahead with an operation unit including a steering wheel 13 and the like.

[Structure of Front Cover Assembly]

Figure 3:
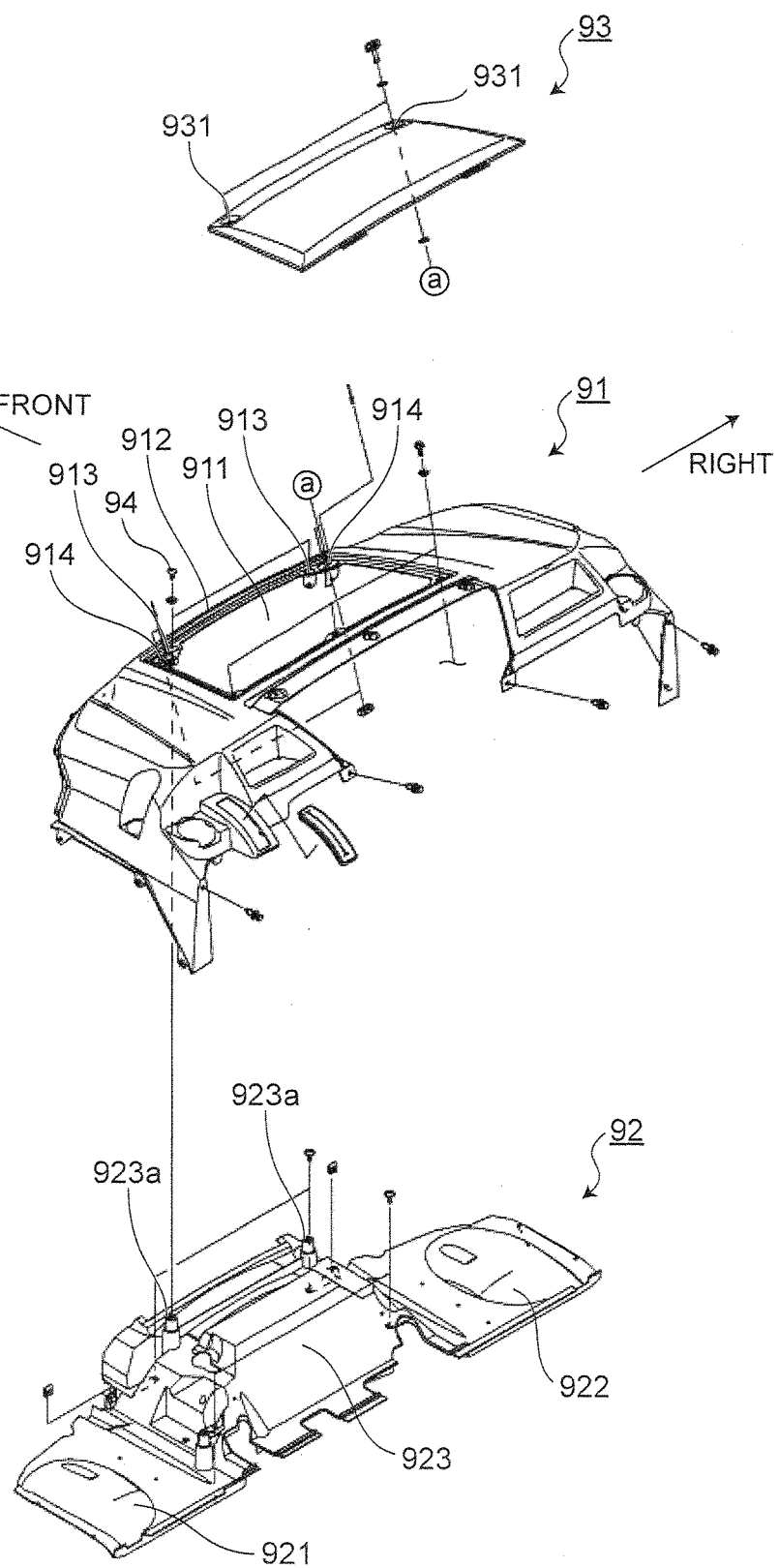
FIG. 3 is an exploded perspective view of a front cover assembly.

FIG. 3 is an exploded perspective view of the front cover assembly 9. As shown in FIG. 3, the front cover assembly 9 includes a front fender 91, a lower fender cover 92, and a front fender cover 93. The lower fender cover 92 is provided below the front fender 91 and forms upper walls of the wheel housings of the front wheels 2. The front fender cover 93 is attached to the top of the front fender 91 and forms an upper wall of an accommodation space of the front cover assembly 9.

The lower fender cover 92 includes end portions 921 and 922 and a center portion 923. The end portions 921 and 922 are attached to the chassis frame and positioned at the respective ends in the vehicle width direction to form the upper walls of the wheel housings of the front wheels 2. The center portion 923 is positioned between the end portions 921 and 922. The end portion 921, the center portion 923, and the end portion 922 are integrally provided in the mentioned order from the left end to the right end of the entire vehicle width. The center portion 923 is positioned above the end portions 921 and 922 such that the lower fender cover 92 has a projecting shape in a front view with an upwardly projecting center in the vehicle width direction.

Figure 4:
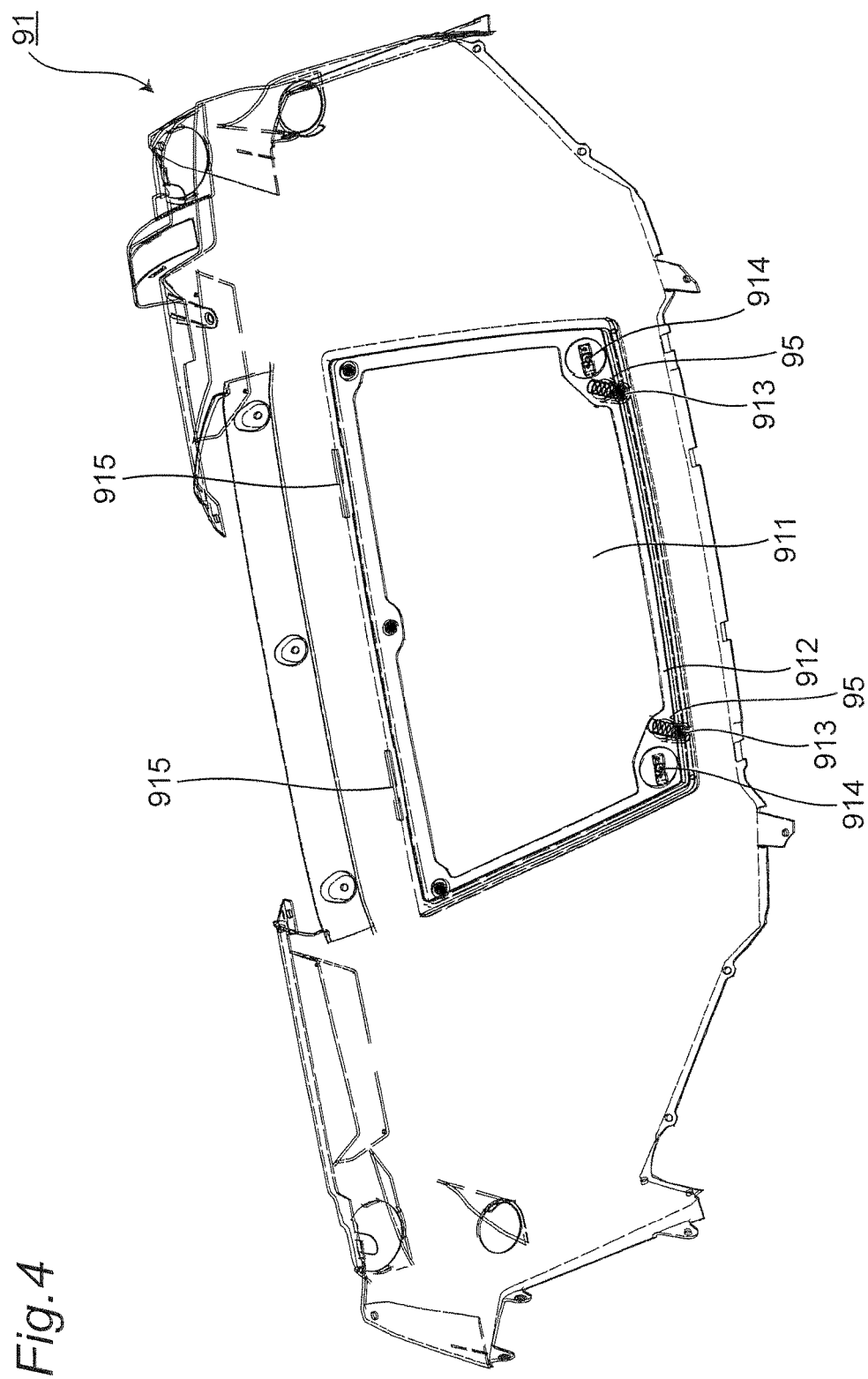
FIG. 4 is a front perspective view of a front fender.

FIG. 4 is a front perspective view of the front fender 91. As shown in FIGS. 3 and 4, the front fender 91 is attached, with bolts 94, to a pair of upwardly projecting boss portions 923a that is provided at a front portion of the center portion 923 of the lower fender cover 92 and is aligned in the vehicle width direction. The front fender 91 has downwardly extending ends in the vehicle width direction. Similarly to the lower fender cover 92, the front fender 91 is integrally provided across the entire vehicle width and has an inversed U shape with an upward projection in a front view. The front fender 91 is provided, at the center in the vehicle width direction, with a vertically penetrating opening 911. The opening 911 has a rectangular shape with sides in the vehicle width direction being longer than sides in the anteroposterior direction.

The opening 911 has an edge 912 including a front potion that has insertion holes 913 at ends in the vehicle width direction. The insertion holes 913 allow the bolts 94 to be inserted therethrough. Lock holes 914 configured to lock and attach the front fender cover 93 to the front fender 91 are provided at positions adjacent to and outside in the vehicle width direction of the insertion holes 913.

Retaining members 95 configured to retain the front fender cover 93 at a predetermined distance from the front fender 91 are attached to the insertion holes 913 so as to be jointly fastened by the bolts 94, respectively. The edge 912 has a rear portion provided with a pair of long thin holes 915 allowing the front fender cover 93 to be inserted thereto. The long thin holes 915 are aligned in the vehicle width direction and extend in the vehicle width direction. The upper surface of the edge 912 is recessed downward from the remaining upper surface of the front fender 91 such that the front fender cover 93 is fitted to the edge 912.

Figure 5:
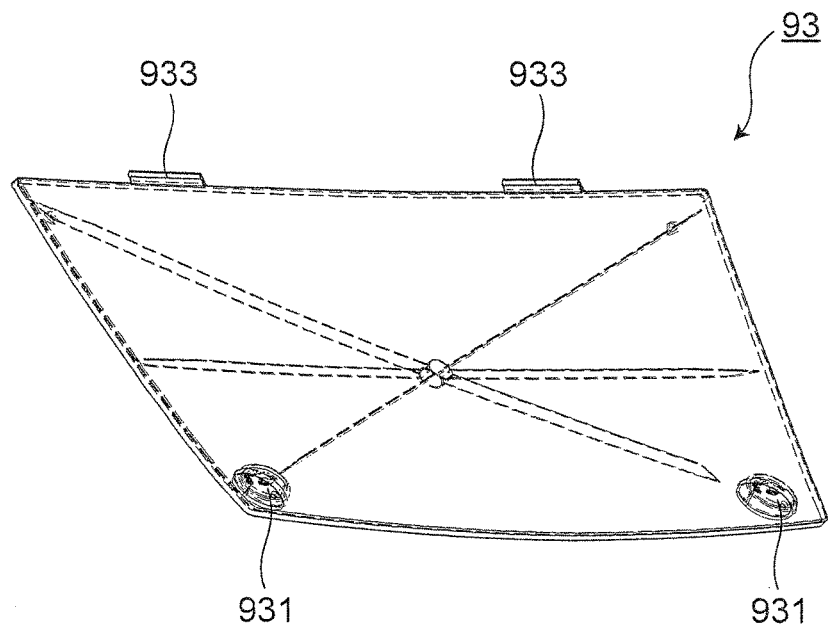
FIG. 5 is a top perspective view of the front fender cover.
Figure 6:
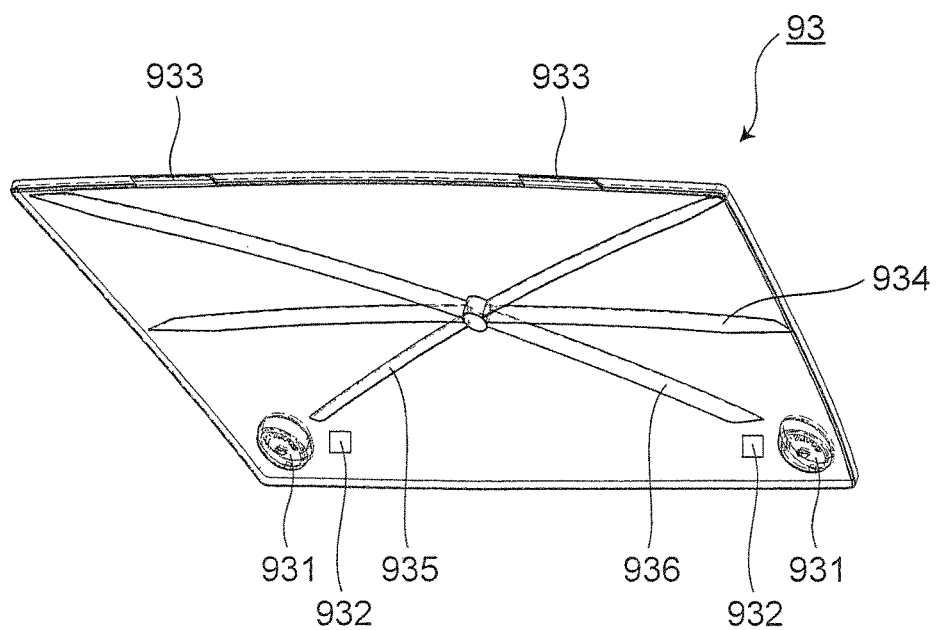
FIG. 6 is a bottom perspective view of the front fender cover.

FIG. 5 is a top perspective view of the front fender cover, and FIG. 6 is a bottom perspective view of the front fender cover. As shown in FIGS. 3 to 6, the front fender cover 93 is attached to the edge 912 of the front fender 91 so as to cover the opening 911 of the front fender 91. The front fender cover 93 is provided, at the respective ends in the vehicle width direction of a front portion, with lock members 931. The lock members 931 engage with the lock holes 914 of the front fender 91, respectively, to lock the front fender cover 93 to the front fender 91.

The front fender cover 93 has a rear surface provided with buffer members 932 that are positioned inside in the vehicle width direction of the lock members 931 and are in contact with the retaining members 95, respectively. Each of the buffer members 932 is a rubber damper or the like.

The front fender cover 93 are provided, at a rear portion, with a pair of inserts 933 that projects backward, extends in the vehicle width direction, and is aligned in the vehicle width direction. When the inserts 933 are inserted to the long thin holes 915 of the front fender 91, the front fender cover 93 is inserted to the front fender 91 with the rear portion being fixed thereto.

The front fender cover 93 has a rectangular shape in a top view and is curved to project upward. The front fender cover 93 has a lower surface provided with three ribs, namely, a first rib 934, a second rib 935, and a third rib 936. The first rib 934 is positioned at the center in the anteroposterior direction and extends across the entire vehicle width along a long side of the front fender cover 93. The second and third ribs 935 and 936 extend diagonally from positions adjacent to the lock members 931.

Figure 7:
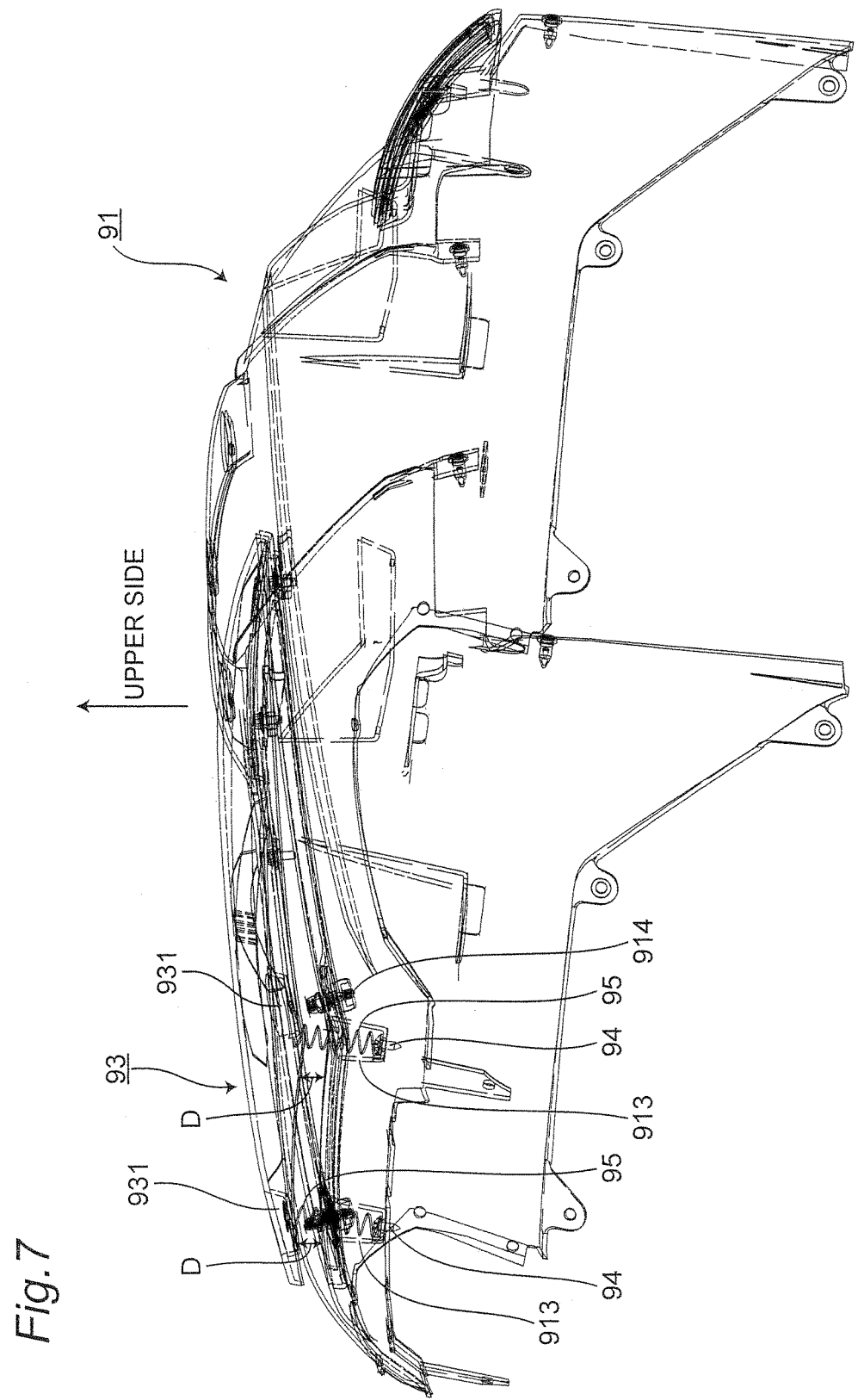
FIG. 7 is a front perspective view of a state where the front fender cover is inserted to the front fender and is not locked.
Figure 8:
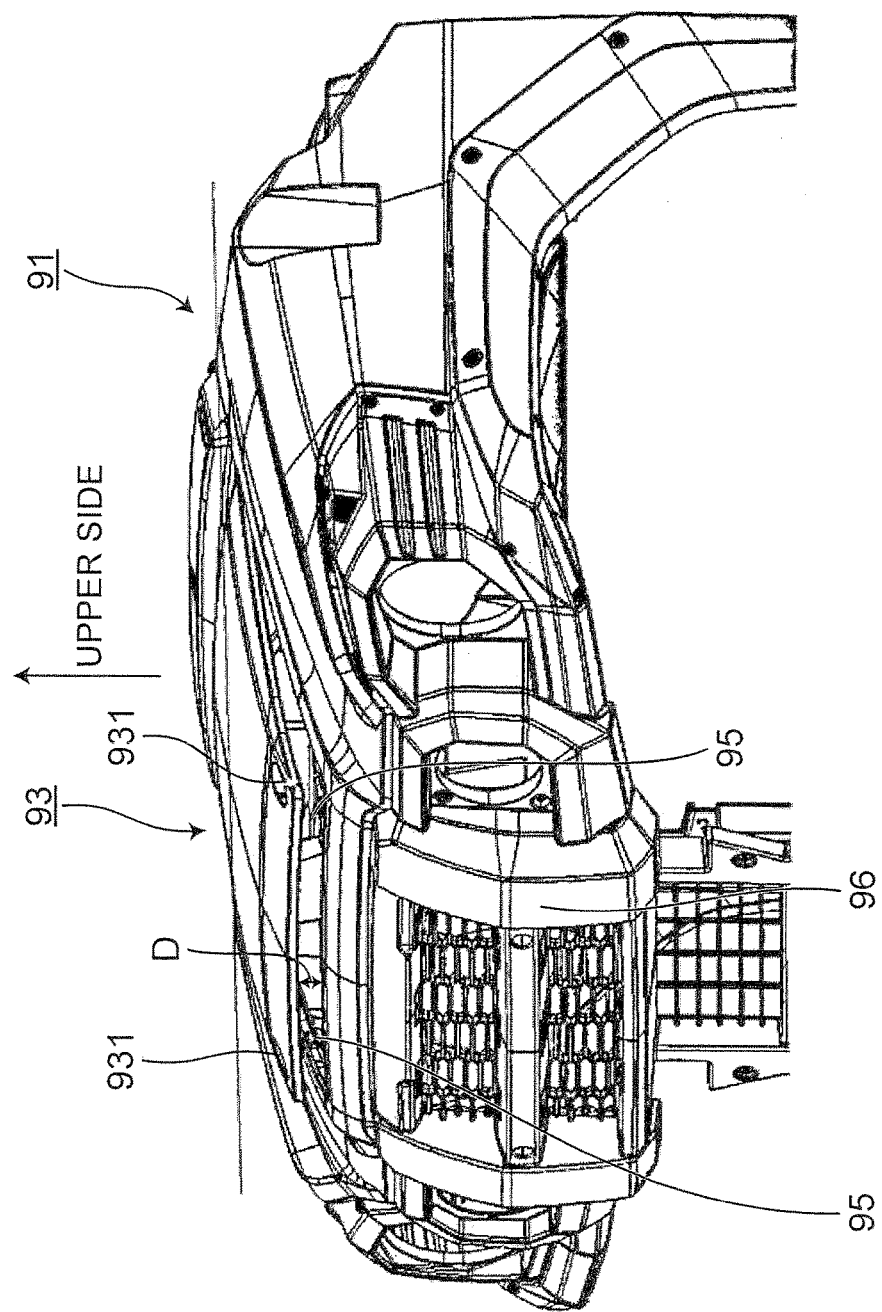
FIG. 8 is a front perspective view of the state shown in FIG. 7 where a front grille is attached to the front fender.

FIG. 7 is a front perspective view of a state where the front fender cover 93 is inserted to the front fender 91 and is not locked. FIG. 8 is a front perspective view of the state shown in FIG. 7 where a front grille 96 covering the front end of the front chamber is attached to the front fender 91. As shown in FIGS. 7 and 8, the retaining members 95 are attached to the insertion holes 913 of the front fender 91 and the boss portions 923a of the lower fender cover 92 so as to be jointly fastened by the bolts 94.

The retaining members 95 are configured to retain the front fender cover 93 at a position above the front fender 91 with a predetermined distance D therebetween in a state where the inserts 933 of the front fender cover 93 are inserted to the long thin holes 915 of the front fender 91 and the lock members 931 are not locked to the lock holes 914. A user locks the lock members 931 to the lock holes 914 by pressing downward the front fender cover 93 against elastic force of the retaining members 95. When the lock members 931 are locked to the lock holes 914, the front fender cover 93 is fitted to the edge 912 of the front fender 91 and is thus attached to the front fender 91. The upper surface of the front fender 91 and the upper surface of the front fender cover 93 are evenly continuous with each other in this state.

Figure 9:
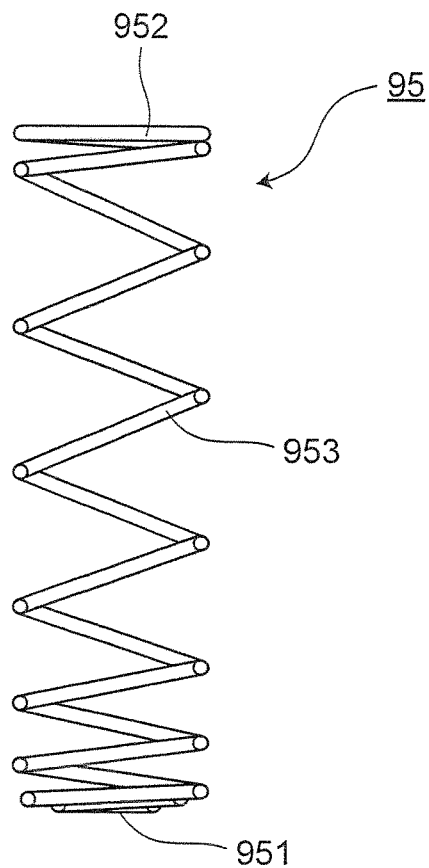
FIG. 9 is a side view of a retaining member.
Figure 10:
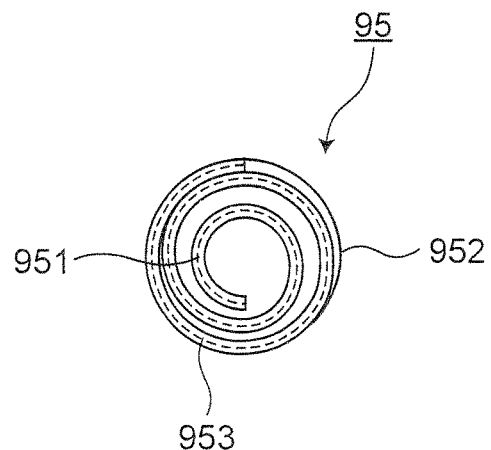
FIG. 10 is a top view of the retaining member.

FIG. 9 is a side view of the retaining member 95, and FIG. 10 is a top view of the retaining member 95. As shown in FIGS. 9 and 10, the retaining member 95 is a spring coil member. The retaining member 95 has a lower end portion 951 and an upper end portion 952 each of which has a spring constant larger than that of an intermediate portion 953. The lower end portion 951 has an outer diameter smaller than those of the remaining portions. Specifically, the outer diameter of the lower end portion 951 is about a half of the outer diameters of the remaining portions. The retaining members 95 are structured to be unlikely to fall while retaining the front fender cover 93. Each of the bolts 94 is retained by the corresponding retaining member 95 in a state where the bolt 94 penetrates the lower end portion 951 having a small diameter. The upper end portion 952 has a substantially flat upper surface following the front fender cover 93 so as to planarly support the front fender cover 93.

The attachment structure of the front fender cover thus configured can achieve the following effects.

(1) Each of the retaining members 95 retains the front fender cover 93 at the position above the front fender 91 with the predetermined distance D therebetween in the state where the front fender cover 93 is not locked. A user can thus readily notice the state where the front fender cover 93 is not locked.

(2) Each of the retaining members 95 is a spring coil member, so that the retaining members 95 are easily provided to retain the front fender cover 93 at the predetermined distance D from the front fender 91.

(3) The retaining members 95 are positioned adjacent to the lock members 931 and the lock holes 914, so-called lock mechanisms, respectively. The retaining members 95 thus enable readily checking the state where the front fender cover 93 is not locked.

(4) Each of the retaining members 95 is a spring coil member and is attached by being jointly fastened by the corresponding bolt 94 that attaches the front fender 91 to the lower fender cover 92. The retaining members 95 are attached with the existing bolts 94 that attach the front fender 91 to the lower fender cover 92, so that the retaining members 95 each have a simplified attachment structure.

(5) The buffer members 932 are attached to the front fender cover 93 so as to be in contact with the retaining members 95, respectively. The buffer members 932 prevent a scratch from occurring to the front fender cover 93 due to contact between the front fender cover 93 and the retaining members 95.

(6) The front fender cover 93 is provided with the plurality of ribs, namely, the first rib 934, the second rib 935, and the third rib 936, which extend in the vehicle width direction along the long side. The front fender cover 93 is thus made stronger with no increase in thickness of the front fender cover 93.

(7) In the state where the lock members 931 are locked to the lock holes 914, respectively, the front fender cover 93 is fitted to the edge 912 of the front fender 91 and the upper surface of the front fender 91 and the upper surface of the front fender cover 93 are evenly continuous with each other. The periphery of the attached front fender cover 93 thus has better appearance.

(8) In each of the retaining members 95, the lower end portion 951 and the upper end portion 952 each have a spring constant larger than that of the intermediate portion 953. The retaining members 95 are structured to be unlikely to fall while retaining the front fender cover 93. Elastic force of the retaining members 95 is thus likely to be directed upward along which the front fender cover 93 is to be opened. Each of the bolts 94 is retained by the corresponding retaining member 95 in the state where the bolt 94 penetrates the lower end portion 951 having the small diameter. The retaining members 95 thus exert better retaining properties for the bolts 94. The upper end portion 952 has the substantially flat upper surface following the front fender cover 93 so as to planarly support the front fender cover 93 with better supporting properties for the front fender cover.

Each of the retaining members 95 according to the embodiment described above is a spring coil member. However, each of the retaining members 95 is not limited thereto but has only to be a spring member such as a flat spring. In the case where the retaining members 95 are attached by being jointly fastened by the bolts 94 that attach the front fender 91 to the lower fender cover 92, each of the retaining members 95 is preferred to be a spring coil member.

The front fender cover 93 according to the above embodiment is attached to the front fender 91 by being inserted to the rear portion in the anteroposterior direction of the front fender 91 and locked at the front portion of the front fender 91. The front fender, cover 93 is alternatively configured to be attached to the front fender 91 by being inserted to the front portion in the anteroposterior direction of the front fender 91 and locked at the rear portion of the front fender 91. In this case, the retaining members 95 are preferably provided not adjacent to the inserts 933 and the long thin holes 915 but adjacent to the lock members 931 and the lock holes 914. Still alternatively, the front fender cover 93 is attached to the front fender 91 by being inserted to a first end portion in the vehicle width direction (e.g. a left end portion) of the front fender 91 and locked at a second end portion in the vehicle width direction (e.g. a right end portion) of the front fender 91.

According to the above embodiment, the retaining members 95 are attached to the front fender 91 and the buffer members 932 are attached to the front fender cover 93. Alternatively, the retaining members are attached to the front fender cover and the buffer members are attached to the front fender.

The present invention can be modified or changed in various manners without departing from the spirit and scope of the present invention recited in the following patent claims.

The invention claimed is:

1. An attachment structure of a front fender cover of a utility vehicle, the attachment structure comprising:
   a front fender;
   a front fender cover attached to the front fender by being inserted to a first end of the front fender and locked at a second end of the front fender; and
   a retaining member attached to the front fender or the front fender cover and configured to retain the front fender cover at the second end of the front fender at a predetermined distance from the front fender in a state where the front fender cover is inserted to the front fender and is not locked.

2. The attachment structure of the front fender cover according to claim 1, wherein
   the retaining member is a spring member.

3. The attachment structure of the front fender cover according to claim 1, wherein
   the retaining member is positioned adjacent to each of a pair of lock members that is aligned in a vehicle width direction and is configured to lock the front fender cover to the front fender.

4. The attachment structure of the front fender cover according to claim 1, wherein
   the retaining member is a spring coil member, and
   the retaining member is attached by being jointly fastened by a bolt that attaches the front fender to a lower fender cover positioned below the front fender.

5. The attachment structure of the front fender cover according to claim 4, wherein
   the front fender cover has a buffer member that is attached to be in contact with the retaining member.

* * * * *